(12) United States Patent
Halamandaris et al.

(10) Patent No.: US 10,106,242 B1
(45) Date of Patent: Oct. 23, 2018

(54) MECHANICALLY ATTACHED THERMAL PROTECTION SYSTEM

(71) Applicant: The Boeing Company, Chicago, IL (US)

(72) Inventors: George P. Halamandaris, Newport Beach, CA (US); Thomas R. Pinney, Long Beach, CA (US); Jonathan D. Embler, Tustin, CA (US); Adam J. Lang, Orange, CA (US); Keith G. Rackers, Florissant, MO (US); Stephen E. Lehman, Golden Eagle, IL (US)

(73) Assignee: THE BOEING COMPANY, Chicago, IL (US)

( * ) Notice: Subject to any disclaimer, the term of this patent is extended or adjusted under 35 U.S.C. 154(b) by 1189 days.

(21) Appl. No.: 14/457,285

(22) Filed: Aug. 12, 2014

(51) Int. Cl.
*B64C 1/40* (2006.01)
*B64D 33/04* (2006.01)

(52) U.S. Cl.
CPC .............. *B64C 1/403* (2013.01); *B64D 33/04* (2013.01)

(58) Field of Classification Search
CPC ................................ B64C 1/403; B64D 33/04
USPC .......................................................... 244/121
See application file for complete search history.

(56) References Cited

U.S. PATENT DOCUMENTS

| | | | | |
|---|---|---|---|---|
| 3,334,458 A * | 8/1967 | Leemhuis | ................. | E04B 5/38 52/220.3 |
| 3,490,718 A * | 1/1970 | Vary | ........................ | B64G 1/50 165/104.25 |
| 3,526,072 A * | 9/1970 | Campbell | ................. | F16B 5/01 29/452 |
| 4,344,591 A * | 8/1982 | Jackson | .................... | B64C 1/38 244/132 |
| 4,686,128 A * | 8/1987 | Gentilman | ................ | B32B 3/30 244/121 |
| 4,804,571 A * | 2/1989 | Jouffreau | ................ | F16L 59/12 244/117 A |
| 4,919,366 A * | 4/1990 | Cormier | .................... | B64C 1/38 220/592.21 |
| 5,547,628 A * | 8/1996 | Lacombe | ................ | C04B 35/82 264/129 |
| 6,035,795 A * | 3/2000 | Dhellemmes | ........... | B63B 25/16 114/74 A |
| 6,293,496 B1 * | 9/2001 | Moe | ........................ | B64G 1/58 244/119 |

(Continued)

*Primary Examiner* — Tien Q Dinh
*Assistant Examiner* — Steven Hawk
(74) *Attorney, Agent, or Firm* — MH2 Technology Law Group LLP

(57) ABSTRACT

A mechanically attached thermal protection system (MATPS) includes an insulating tile having a top surface, a bottom surface, and a plurality of access holes that extend through the insulating tile from the top surface to the bottom surface. A plurality of brackets include a first end attached to the insulating tile and a second end including a mounting hole therethrough, the second end being positioned proximate the bottom surface of the insulating tile. A plurality of fasteners are positioned proximate the bottom surface of the insulating tile and at least partially positioned within one of the access holes so as to be accessible from the top surface of the insulating tile through one of the plurality of access holes. A MATPS including a plurality of air channels within the insulating tile and a method for sealing these air channels to those within an adjacent structure is also described herein.

18 Claims, 4 Drawing Sheets

(56) References Cited

U.S. PATENT DOCUMENTS

| | | | | |
|---|---|---|---|---|
| 6,592,981 | B1* | 7/2003 | Rawal | B64G 1/58 244/159.1 |
| 6,827,312 | B2* | 12/2004 | Riedell | B64G 1/58 244/133 |
| 7,887,937 | B2* | 2/2011 | Heng | B32B 18/00 427/189 |
| 8,291,594 | B2* | 10/2012 | Etling | B64G 1/58 244/159.1 |
| 8,752,350 | B2* | 6/2014 | Pinney | B64G 1/58 428/137 |
| 9,211,960 | B2* | 12/2015 | Embler | B64C 1/40 |
| 9,248,923 | B2* | 2/2016 | Pinney | B64G 1/58 |
| 2003/0000949 | A1* | 1/2003 | Dhellemmes | B63B 25/16 220/4.12 |
| 2010/0068926 | A1* | 3/2010 | Nightingale | H02S 20/25 439/577 |
| 2010/0095626 | A1* | 4/2010 | Embler | B64C 1/40 52/506.05 |
| 2011/0209864 | A1* | 9/2011 | Figus | F28D 15/0275 165/287 |

\* cited by examiner

MECHANICALLY ATTACHED THERMAL PROTECTION SYSTEM

TECHNICAL FIELD

The present teachings relate to the field of thermal protection systems and, more particularly, to thermal protection devices used in exhaust systems or other systems of vehicles such as jet-propelled vehicles, aerospace vehicles, rockets, and other vehicles that may be exposed to or produce a high heat source such as a high temperature exhaust.

BACKGROUND

A thermal protection system (TPS) may include various materials in different locations of a vehicle such as a jet-propelled vehicle, an aerospace vehicle, a rocket, etc., depending on the amount of heat protection needed. For example, reinforced carbon-carbon may be used in the nose or leading wing edges of a spacecraft, such as a space shuttle. High temperature reusable surface insulating tiles may be used on the underside of an aircraft. Flexible insulation blankets, low temperature reusable surface insulating tiles, and other materials may be used for different locations on the spacecraft. Each type of thermal protection system may have specific heat protection, impact resistance, and weight characteristics.

It is desirable to have a thermal protection system that requires little or no maintenance. Some thermal protection systems may include modular components that may be quickly removed and replaced. Insulating tiles are examples of components that may be used in a thermal protection system. An insulating tile is a thermal protection system component that may be fabricated from various materials such as ceramic and/or ceramic matrix composite materials. More specifically, the insulating tile may have, for example, a ceramic substrate with a ceramic matrix composite layer wrapped around the inner core. In the event that the insulating tile may need to be replaced after being in service, it is desirable to minimize the amount of time needed to replace the insulating tiles on a vehicle, such as a spacecraft. For example, a vehicle turnaround time of around 48 hours or as little as two hours may be desirable.

Conventional thermal protection systems on existing spacecraft may be adhesively bonded or mechanically attached. With adhesively bonded thermal protection systems, the amount of time and cost associated with installation, inspection, and/or repair may be much greater compared to a mechanically attached system. Further, bonded thermal protection systems may be difficult to remove without damaging or destroying the insulating tile or the underlying substrate of the vehicle. As a result, inspection of a spacecraft substructure and/or internal spacecraft subsystems may be time consuming and expensive. Another drawback of adhesively bonded thermal protection systems is that the temperature of the substrate to which the tile is adhesively bonded may exceed the failure temperature of the adhesive, particularly in exhaust systems and other systems having a high thermal output. In these high-temperature systems, a mechanically attached thermal protection system design must be utilized.

Mechanical attachments for insulating tiles may include, for example, a standoff or a carrier panel. A standoff thermal protection system may include stiffened panels encapsulating a back face insulation that is mechanically attached through flanges or metallic standoffs. A carrier panel thermal protection system may have insulating tiles and/or blankets that are adhesively bonded to metal or composite carrier panels that are mechanically attached to a structure. While thermal protection systems using standoff panels are easier to replace than an insulating tile adhesively bonded directly to the protected substrate, they are still prone to failure at higher temperatures (e.g., >700° F.) as the insulating tile is adhesively bonded to the metal or composite carrier panel.

Mechanically attached thermal protection systems may include brackets for attaching the insulating tile to a deck or substrate using bolts positioned between adjacent insulating tiles. The use of bolts may require a greater space between adjacent insulating tiles when compared with adhesively attached insulating tiles, for example to provide access to the bolts to allow replacement of insulating tiles. While adhesive attachment may allow tighter placement of adjacent insulating tiles, adhesive is less robust in high temperature environments than some mechanical attachment techniques.

With either mechanically attached or thermally attached insulating tiles, a space or gap between adjacent insulating tiles is typically filled with a flexible thermal insulation, or gap filler, to prevent heated gases from reaching an underlying substrate or deck to which the insulating tiles are attached. A large gap between insulating tiles can be difficult to fill and may be prone to failure during heating, for example due to differences in coefficients of thermal expansion between the insulating tile and the gap filler. Further, the thermal insulation in larger spaces may be prone to accelerated deterioration with increasing inter-tile gap widths. Additionally, larger spaces may result in larger aerodynamic drag, which is typically undesirable.

Therefore, a mechanical attachment system and method that allows closer spacing of adjacent insulating tiles and high structural interface temperature, while allowing tile replacement and/or other advantages over conventional adhesive and mechanical attachment thermal protection systems, would be desirable.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A mechanically attached thermal protection system (MATPS) of the present disclosure may include an insulating tile having a top surface, a bottom surface, and a plurality of access holes that extend through the insulating tile from the top surface to the bottom surface, a plurality of brackets including a first end attached to the insulating tile and a second end having a mounting hole therethrough, the second end being positioned proximate the bottom surface of the insulating tile, and a plurality of fasteners positioned proximate the bottom surface of the insulating tile and at least partially positioned within one of the access holes so as to be accessible from the top surface of the insulating tile through one of the plurality of access holes.

An insulating tile may further include a plurality of sides, an inner core, and an outer shell, wherein the outer shell forms at least a portion of the top surface, the bottom surface, and the plurality of sides, a plurality of air channels, wherein each air channel of the plurality of air channels originates at an orifice through the outer shell of the bottom surface of the insulating tile and extends through the inner core of the insulating tile. A MATPS may further include a substrate having a surface with a plurality of air inlets therethrough, wherein air inlet of the plurality of air inlets is in fluid communication with one of the plurality of air channels.

The MATPS may further include a plurality of studs extending from the surface of the substrate, wherein each stud of the plurality of studs extends through one of the mounting holes in one of the plurality of brackets and each fastener of the plurality of fasteners secures one of the plurality of brackets to one of the plurality of studs.

The MATPS may further include a seal between each of the plurality of air inlets and each of the air plurality of air channels, wherein each seal includes an inner circular or oval spring seal having an arcuate cross section and an outer compliant ring that contacts the inner spring seal.

The MATPS may further include a recess within the bottom surface of the insulating tile and a ceramic matrix composite washer positioned within the recess in the bottom surface of the insulating tile, wherein the ceramic matrix composite washer physically contacts the insulating tile and the outer compliant ring.

The MATPS may further include a plurality of capillaries within the inner core that branch from the plurality of air channels and a plurality of openings at the top surface of the insulating tile that extend through the outer shell, wherein each capillary terminates at one of the plurality of openings at the top surface.

The MATPS may include at least one of the air channels through the inner core of the insulating tile that opens into at least one of the access holes.

The MATPS may include an insulating tile having a top surface, a bottom surface, a plurality of sides, an inner core, and an outer shell, wherein the outer shell forms the top surface, the bottom surface, and the plurality of sides, a plurality of air channels within the insulating tile, wherein each air channel originates at an orifice through the outer shell of the bottom surface of the insulating tile, a plurality of capillaries within the inner core that branch from the plurality of air channels, and a plurality of openings at the top surface of the insulating tile that extend through the outer shell, wherein each capillary terminates at one of the plurality of openings at the top surface.

The MATPS may further include a seal positioned at the orifice of each of the plurality of air inlets, wherein each seal includes an inner circular or oval spring seal having an arcuate cross section and an outer compliant ring that contacts the inner spring seal.

The MATPS may further include a plurality of access holes that extend through the insulating tile from the top surface to the bottom surface, wherein at least one of the air channels through the inner core of the insulating tile opens into at least one of the access holes.

The MATPS may further include a substrate having a plurality of air inlets therethrough, wherein each air inlet of the plurality of air inlets is in fluid communication with one of the plurality of air channels, and a pressurized air source in fluid communication with the plurality of air inlets, the plurality of air channels, the plurality of capillaries, and the plurality of openings at the top surface of the insulating tile.

The present teachings further include an aircraft having a surface to be protected from a heat source. The aircraft includes a plurality of studs extending from the surface and a mechanically attached thermal protection system (MATPS) attached to the surface of the aircraft. The MATPS has an insulating tile including a top surface, a bottom surface, and a plurality of access holes that extend through the insulating tile from the top surface to the bottom surface; a plurality of brackets having a first end attached to the insulating tile and a second end with a mounting hole therethrough, the second end being positioned proximate the bottom surface of the insulating tile; and a plurality of fasteners positioned proximate the bottom surface of the insulating tile and at least partially positioned within one of the access holes so as to be accessible from the top surface of the insulating tile through one of the plurality of access holes. Each stud of the plurality of studs extends through one of the mounting holes in one of the plurality of brackets, and each fastener of the plurality of fasteners secures one of the plurality of brackets to one of the plurality of studs.

The present teachings may also include an aircraft wherein the surface to be protected is an exhaust output surface.

The present teachings may also include a perimeter of the insulating tile wherein each of the plurality of access holes, each of the mounting holes through the second end of each bracket, and each of the fasteners is within the perimeter of the insulating tile.

The present teachings may also include aircraft wherein the insulating tile further has a plurality of sides, each bracket is an L-shaped bracket, and each bracket is attached to one of the plurality of sides at an attachment point.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to examples of the present teachings which are illustrated in the accompanying drawings. Wherever possible, the same reference numbers will be used throughout the drawings to refer to the same or like parts.

The present teachings can provide a mechanically attached thermal protection system (MATPS) having a reduced space between adjacent insulating tiles compared with some prior MATPS systems. Reducing the space between adjacent insulating tiles may provide a thermal protection system (TPS) having improved insulating characteristics and reliability. Further, the present teachings include a MATPS that provides, in addition to a passive insulation component (i.e., thermal insulating tile), an active cooling component to assist in maintaining lower temperatures of an underlying substrate.

FIGS. 1-6 and the narrative below present a description of the present teachings. It will be understood that the FIGS. represent generalized schematic illustrations where other structures may be added and existing structures may be removed or modified.

Figure 1:
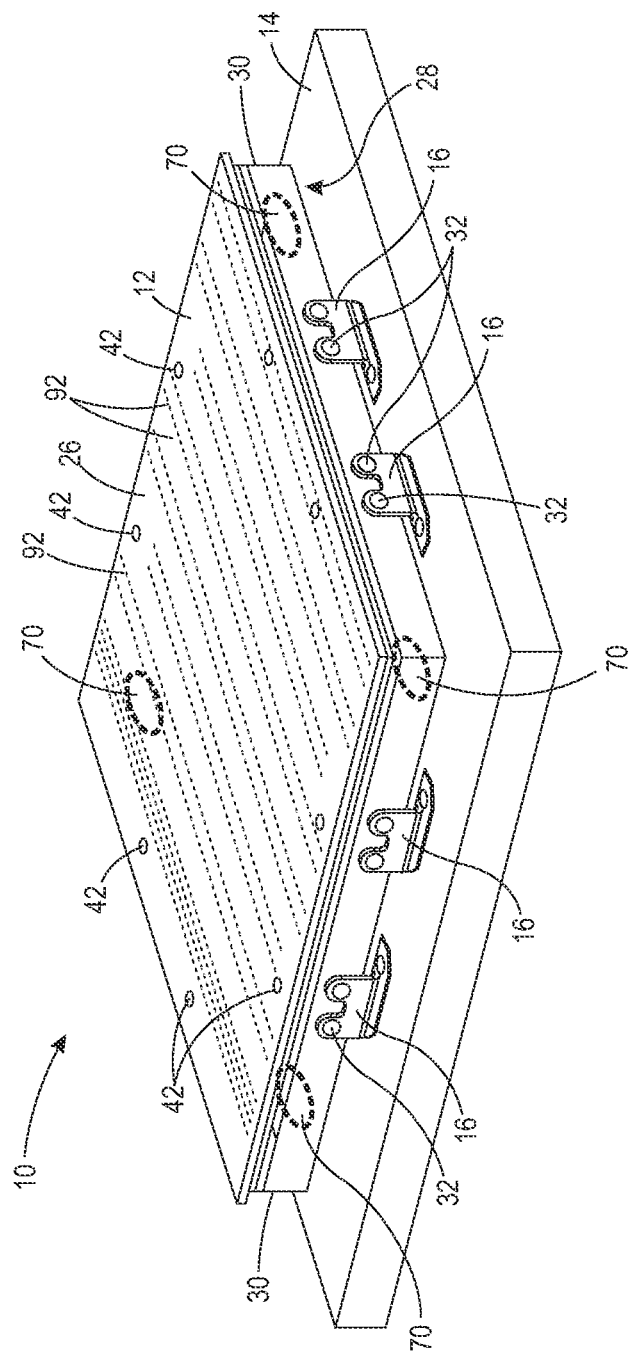
FIG. 1 is a schematic perspective depiction of a portion of a mechanically attached thermal protection system in accordance with the present teachings.
Figure 2:
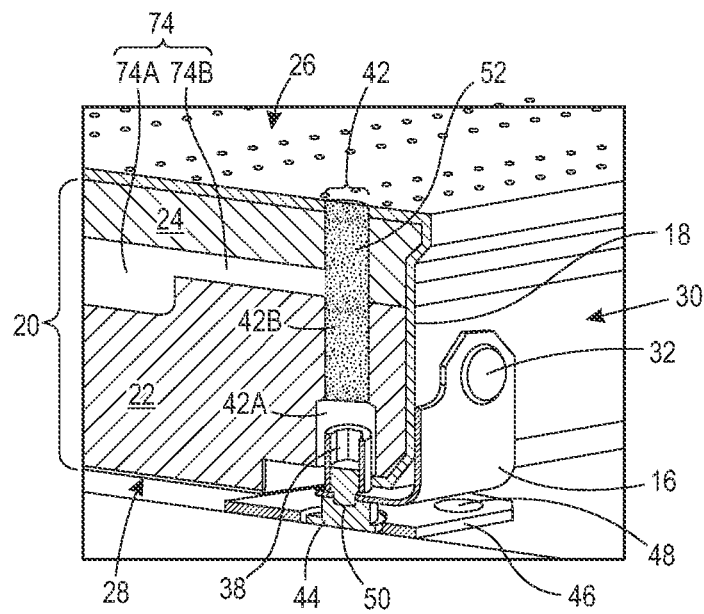
FIG. 2 is a cutaway perspective depiction of a portion of the structure of FIG. 1.

FIG. 1 is a schematic perspective depiction of a portion of a MATPS 10 in accordance with the present teachings. The MATPS 10 may include an insulating tile 12, such as a ceramic matrix composite (CMC)-wrapped insulating tile, mechanically attached to a substrate or deck 14 using a fastening system that includes a plurality of brackets 16, as well as other structures described below. The substrate 14 may be a surface of, for example, a vehicle exhaust port or another surface that requires protection from a heat source. It will be understood that while FIG. 1 depicts a single insulating tile 12, a MATPS 10 may include a plurality of adjacent spaced insulating tiles 12 each attached to the substrate 14 to insulate the substrate 14 and possibly other surfaces and/or structures that underlie each insulating tile 12. Each insulating tile 12 may include a rigid outer shell or coating 18 that wraps around and protects a less structurally robust thermally insulating inner core or panel 20 as depicted in FIG. 2. The outer shell 18 may include a composite with ceramic fibers (i.e., ceramic fiber composite), for example aluminosilicate fibers, such as Nextel® 720 available from 3M™ of St. Paul, Minn., or another suitable material. The inner core 20 may include one or more layers of insulation. The insulating layer of the inner core may include, for example, a ceramic, a silica, an alumina, a fiber (fibrous) insulation, a polymer or another synthetic material insulation, a foam, etc., and combinations of two or more of these depending on a specific design and/or eventual use. As depicted, the inner core 20 may include a lower inner core layer 22 and an upper inner core layer 24. Although other configurations are contemplated, using the two or more separate inner core layers 22, 24, for example, may facilitate the formation of an internal plenum structure including a plurality of air channels for active cooling, as will be described in detail below.

Each insulating tile in the FIG. 1 depiction includes a top surface 26, a bottom surface 28, and sides 30, although insulating tiles having other shapes and configurations are contemplated. As used herein, the "top surface" refers to an insulating tile surface most exposed to and/or facing a thermal source from which the substrate is protected, while the "bottom surface" refers to the surface that faces the substrate being protected from the thermal source, regardless of the actual insulating tile orientation. The outer shell 18 forms at least a portion of the top surface 26, bottom surface 28, and sides 30. Each side 30 may have a plurality of L-shaped brackets 16 attached thereto, where each L-shaped bracket attaches to a side 30 of the insulating tile 12 and extends underneath the bottom surface 28 of the insulating tile 12 as depicted.

While FIG. 1 depicts two brackets 16 attached to each side 30, only one bracket 16 or more than two brackets 16 may be attached to each side 30. The brackets 16 may be manufactured from, for example, a nickel-chromium alloy such as Inco (Inconel™) 718 or another suitable material.

Figure 3:
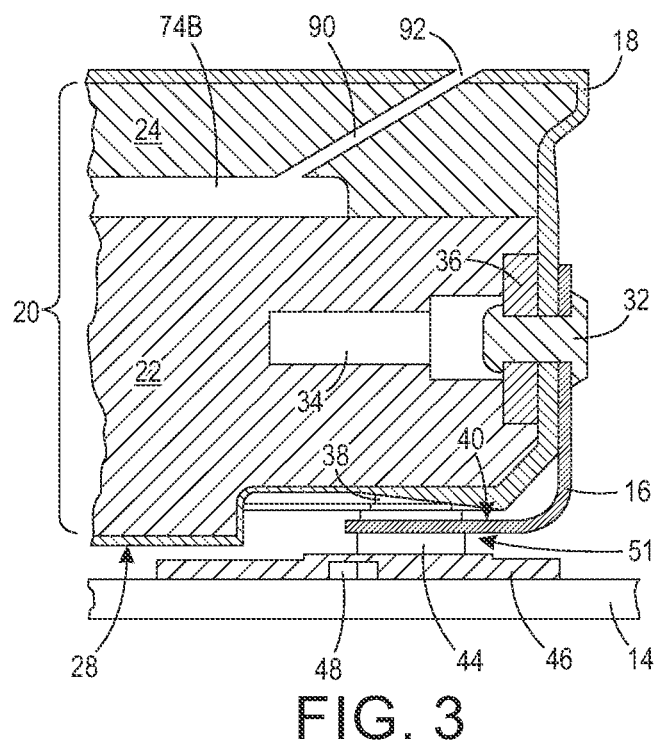
FIG. 3 is a cross section of a portion of the structure of FIG. 1.

Further, FIG. 1 depicts that a first end of each bracket 16 is attached to the side 30 of the insulating tile 12 using two attachment points 32 which may increase the strength of the bracket attachments compared to a single attachment point, such that the bracket 16 attachments are less likely to fail from shear forces. However, any number of bracket attachment points can be used. As depicted in FIG. 3, each side attachment point 32 may be, for example, a Composi-Lok® fastener (available from Monogram Aerospace of Los Angeles, Calif.), rivet, bolt and nut, or another attachment inserted through a hole in the bracket 16 and through a hole in the outer shell 18 of the insulating tile 12. Assembly of each attachment point 32 may be aided by a machined, etched, or molded void 34 within the inner core 20. Further, a CMC washer 36 on the inside of the insulating tile 12 may be used at each attachment point 32 to increase rigidity and attachment strength compared to an attachment through only the outer shell 18. The CMC washer 36 may function as a heat sink to draw heat away from the metal bracket 16 during use in a high-temperature environment.

The insulating tile fastening system further includes a plurality of fasteners 38, such as buried bolts or buried nuts, wherein each fastener 38 is positioned between an inner surface 40 of the bracket 16 and a portion of the insulating tile 12 as depicted in FIGS. 2 and 3, and may be proximate the bottom surface 28 of the insulating tile 12 as depicted. Each fastener 38 may be one of several configurations, such as a hex (Allen) fastener, a star fastener, a slotted fastener, Phillips fastener, or another suitable configuration. The fastener 38 may include internal or external threads that are threaded over or within a threaded stud 44 as described below. The fastener 38 may also have a non-threaded attachment, such as a push nut, push bolt, snap rivet, shape memory alloy fastener, etc. Each fastener 38 may be recessed within the bottom surface 28 of the insulating tile 12 within a machined, etched, or molded access hole 42 through the outer shell 18 and within the inner core 20 of the insulating tile 12. The access hole 42 may further extend vertically, completely through the insulating tile 12 from the top surface 26 to the bottom surface 28 as depicted in FIG. 2. A lower portion 42A of the access hole 42 may have a first width or diameter to accommodate a width of the fastener 38, while an upper portion 42B of the access hole 42 may have a second width or diameter to accommodate access to the fastener 38 using, for example, a tool such as a hex key, alien key, torx key, screwdriver, etc. The second width 42B of each access hole 42 may be narrower than the first width 42A and narrower than a width or diameter of the fastener 38. As such, the fastener 38 may be held in position by, and next to, the bracket 16 without falling from the upper portion 42A of the access hole 42 through the top surface 26 of the insulating tile 12, or from the lower portion 42A of the access hole 42 through the bottom surface 28 of the insulating tile 12, prior to attachment of the insulating tile 12 to the substrate 14.

The insulating tile fastening system may further include a plurality of internally or externally threaded studs 44, for example floating or fixed titanium studs, that extend from the substrate 14. The plurality of studs 44 may be molded as part of the substrate 14 or may be installed onto the substrate 14 after formation of the substrate 14 using, for example, a threaded stud that is screwed into a threaded hole in the substrate 14 or a stud that is attached to the substrate 14 using an adhesive. Floating studs, if used, may reduce damage to the insulating tile 12 and/or substrate 14 during expansion of the insulating tile 12 and/or substrate 14 during thermal cycling. Floating studs may include a housing bracket 46 mounted to the substrate 14 using fasteners 48 as depicted in FIG. 2.

The brackets 16 may include mounting holes 50 through a second end of the bracket 16 that is proximate the bottom surface 28 of the insulating tile 12, where each mounting hole 50 is configured to receive one of the studs 44. Each stud 44 may include a shoulder 51 as depicted, for example, in FIG. 3 upon which a bottom surface of each bracket 16 rests.

The insulating tiles 12 may be attached to the substrate 14 by placing the studs 44 that extend from the surface of the substrate 14 into the mounting holes 50 through the second end of the bracket 16. A tool appropriate for the type of fastener 38 is then inserted into the upper portion 42B of the access hole 42 at the top surface 26 of the insulating tile 12 and is used to tighten each fastener 38 onto each stud 44. For example, each of the plurality of fasteners 38 may be threaded onto their respective stud 44. This secures each bracket 16 onto one of the studs 44, and thereby secures the insulating tile 12 to at least one of the studs 44, and thereby secures the insulating tile 12 to the plurality of studs 44 and to the substrate 14.

After tightening or otherwise engaging each fastener 38, each access hole 42 may be plugged or filled with an insulator 52 to reduce heating of the fastener 38 and the core 20 of the insulating tile during use. The insulator 52 may include, for example, Nextel® 720 braided cord adhered with a ceramic adhesive.

As may be seen in FIGS. 1 and 2, for example, the access holes 42 that provide access to each fastener 38 are inside an insulating tile perimeter that is defined by each of the plurality of sides 30. Thus, each insulating tile 12 may be placed closer to an adjacent insulating tile 12 than is possible with some conventional thermal protection systems that have tile-to-substrate attachment points that are outside a perimeter of each insulating tile (i.e., at a location between insulating tiles rather than underneath each tile). The close proximity of each insulating tile to an adjacent insulating tile may allow a reduction in the space or gap between insulating tiles that must be filled with an insulator.

The majority of force exerted on the insulating tiles 12 during use, typically from an exhaust gas or other fluid stream flowing across the top surface 26 of the insulating tile 12 (e.g., in a direction parallel with the top surface 26 of the insulating tile 12), will typically be vertical forces pulling in a direction perpendicular to the top surfaces 26 of the insulating tiles 12. It will be appreciated that vertical forces exerted on the insulating tile 12 will translate into shear forces on the L-shaped bracket 16. In contrast, replacing the L-shaped brackets 16 with flat brackets that attach to the bottom surface of the insulating tile 12, while allowing access to the fasteners 38, would translate vertical forces exerted on the insulating tile 12 during use into pull-out forces on a flat bracket rather than the shear forces exerted on an L-shaped bracket. However, flat brackets may function sufficiently in environments having low fluid velocities and/or densities.

Figure 5:
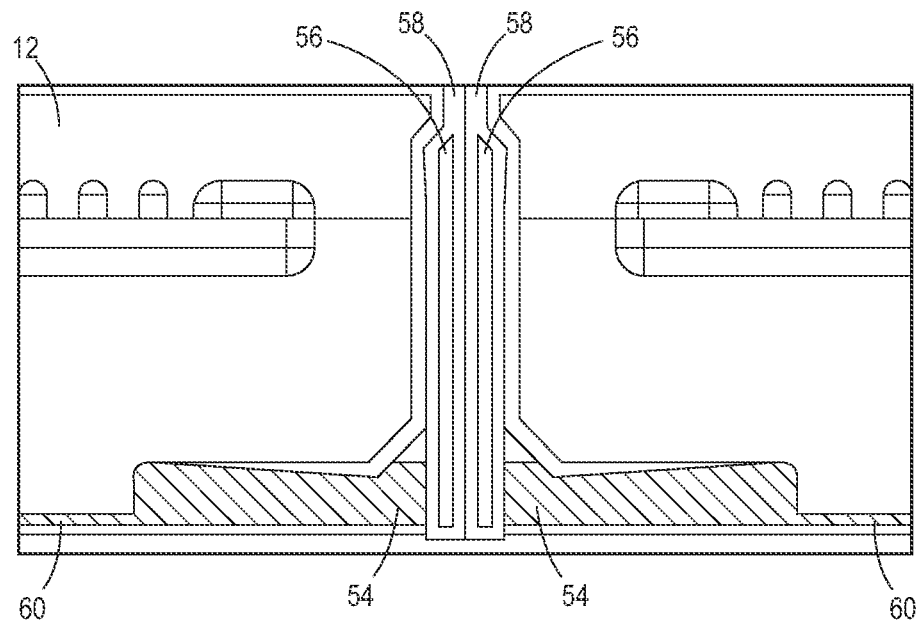
FIG. 5 is a cross section depicting portions of two adjacent thermal insulating tiles in accordance with the present teachings.

FIG. 5 depicts parts of two adjacent insulating tiles 12. After attaching the insulating tiles 12, a conformal gap filler sock 54 may be placed around each insulating tile 12 to fill any gaps between the insulating tiles 12. The gap filler sock 54 thermally insulates the brackets 16 and attachment points 32 during use, and reduces or prevents hot gases such as exhaust gas from flowing between insulating tiles 12. The gap filler sock 54 may include a batting material 56 such as Saffil® batting 56, available from Saffil LTD, Cheshire, UK, that forms sidewalls and is machined to fill the voids or gaps between adjacent insulating tiles 12. The batting material 56 may be sewn inside a ceramic fabric 58, such as Nextel® 440 ceramic fiber, that fits around the insulating tile 12. The bottom 60 of the gap filler sock 54 may be closed out with a lightweight glass fabric, such as fiberglass, which constrains the sidewalls and reduces or prevents the migration of the gap filler sock 54 into the exhaust port under high dynamic loads.

A MATPS 10 may further optionally include actively cooled insulating tiles 12. The active cooling insulating tiles may be implemented using various structures and techniques to provide, for example, a flow of air through the insulating tile 12 during use. A plurality of air inlets 70 extending through the substrate 14 may be used to provide air from an air supply (e.g., pressurized air source) 72 to the insulating tile 12. The plurality of air inlets 70 may be used to flow air through the substrate 14 and into the insulating tile 12.

Figure 4:
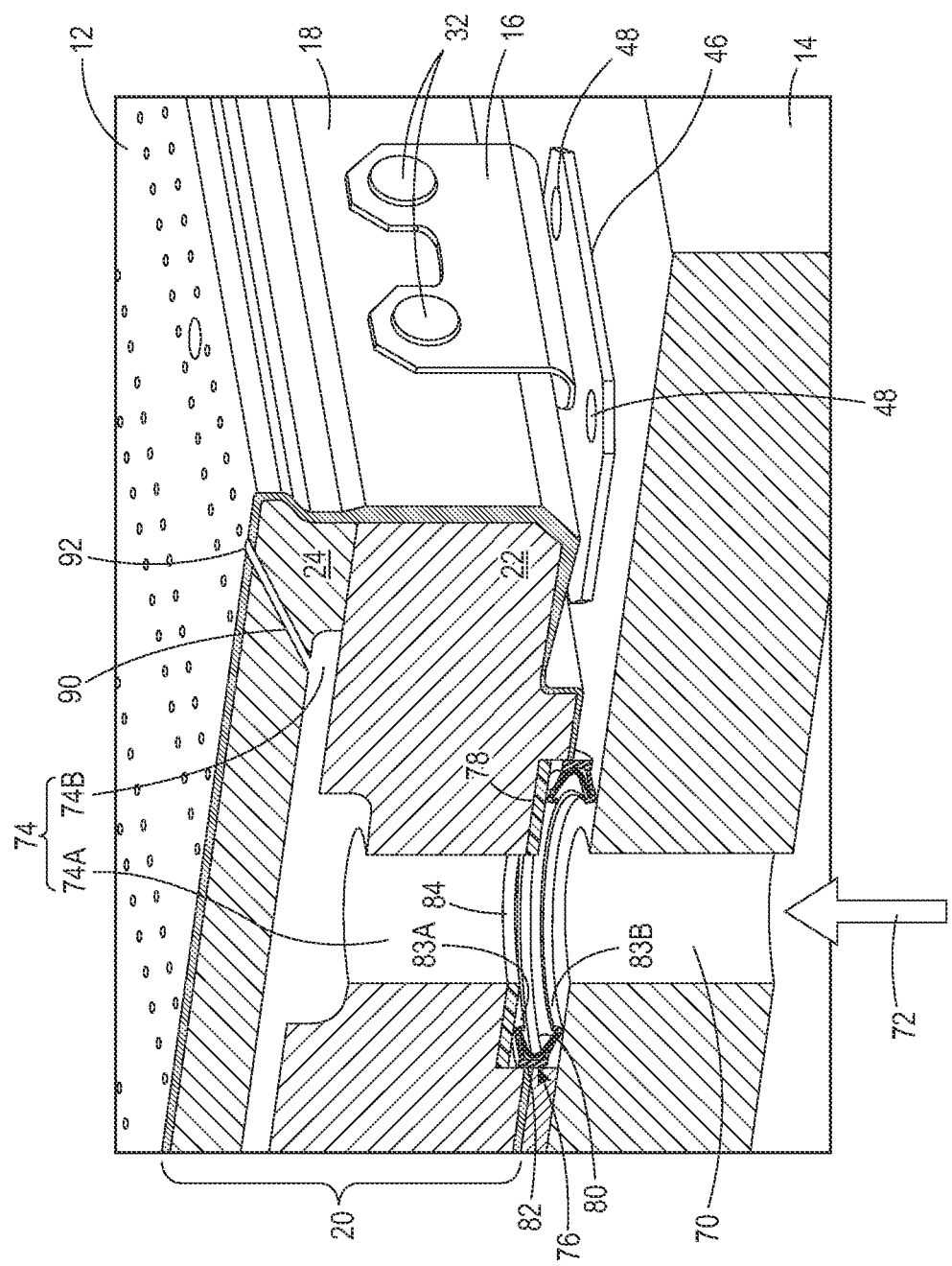
FIG. 4 is a cutaway perspective depiction of a portion of the structure of FIG. 1.

As depicted in FIG. 4, a plurality of air channels 74 may be formed within the inner core 20 of each insulating tile 12. Each of the plurality of air channels 74 may originate at an orifice through the bottom surface 28 of the insulating tile 12 as depicted. The plurality of air channels 74 may be constructed using a plurality of first air channels 74A formed within the lower inner core layer 22 and a plurality of second air channels 74B formed within the upper inner core layer 24. The plurality of air channels 74A, 74B may be formed, for example, using a router, a drill, a laser, mechanical or chemical etching, formed during molding of the core layers 22, 24, etc. Forming each insulating tile 12 with individual lower 22 and upper 24 inner core layers, and optionally one or more additional layers, may simplify formation of an internal plenum including the air channels 74 and capillaries 90 used for active cooling of the insulating tile 12 during use. For example, once the first air channels 74A are formed in the lower inner core layer 22 and the second air channels 74B are formed within the upper inner core layer 24, the two layers are aligned, placed in contact with each other, optionally adhered to each other using an adhesive to form the plurality of air channels 74, and then sealed within the outer shell 18. In another arrangement, the inner core 20 may be formed from a single insulation layer, where air channels 74 may be formed by drilling holes or slots through the sides 30 of the insulating tiles 12 and into the core 20. Subsequently, these holes or slots in the sides 30 of the insulating tile 12 may be filled with a suitable filler material, leaving the air channels 74 within the single-layer core 20.

Each insulating tile 12 may further include a plurality of capillaries 90 that branch from the air channels 74 and terminate at one or more openings 92 in the outer shell 18 of the insulating tile 12.

The air channels 74, for example second air channels 74B as depicted in FIG. 2, or first air channels 74A, may be designed to open into the access holes 42. During use, air from the plenum, specifically from the air channels 74, may be routed into the access holes 42 to reduce or eliminate the flow of exhaust gases into the access holes 42 during use of the insulating tiles 12. Routing air from the air channels 74 into the access holes 42 may eliminate the need for an insulator 52 within the access holes 42. The use of both air flow from air channels 74 into access holes 42 and insulator 52, as well as only insulator 52 or only air flow from air channels 74 into access holes 42, is contemplated. If air flow from air channels 74 into access holes 42 is not used, air channel 74B as depicted in FIG. 2 will terminate before it reaches access hole 42.

The active cooling system formed by the actively cooled tiles may further include an optional seal 76 placed within a recess 78 in the insulating tile 12 and/or substrate 14 to reduce or eliminate air leaks between the substrate 14 and the air channel orifice of the insulating tile 12. The seal 76 may include, for example, a circular or oval inner spring seal 80 and an outer compliant ring 82 that physically contacts the inner spring seal 80. The inner spring seal 80 may be manufactured from a polymer, a metal, a metal alloy, etc., while the outer compliant ring 82 may be manufactured from a synthetic pliable material such as a polytetrafluoroethylene (PTFE). The inner spring seal 80 may have an arcuate cross section, and may be held in place within the outer compliant ring 82 through friction contact with an upper lip 83A and a lower lip 83B of the outer compliant ring 82 as depicted in FIG. 4. When the spring seal 80 is compressed to an extent, it flexes inward, flattens, and provides an outward spring force toward the outer compliant ring 82, the insulating tile 12, and the substrate. The outward spring force provided by the inner spring seal 80 and the pliability provided by the outer compliant ring 82 seals a gap between the insulating tile 12 and the substrate 14 to which the insulating tile 12 is attached. The pressurized flow of air between the substrate 14 and the insulating tile 12 through air inlets 70 into first air channels 74A may improve the efficiency of the seal 76, for example by biasing or forcing walls of the inner spring seal 80 apart during use.

The seal 76 may further include one or more washers 84 formed, for example, from CMC bonded to the insulating tile 12. The one or more CMC washers 84 positioned within the recess 78 may provide a hard surface to support the seal 76 and to provide a surface upon which the seal 76, and more particularly the outer compliant ring 82, may bear. This CMC washer 84 may therefore further improve the seal 76 between the substrate 14 and the insulating tile 12, for example through physical contact with the insulating tile and the outer compliant ring 82.

During use, air from the pressurized air source 72, which may be an air pump, an air scoop, or another air source, is in fluid communication with the air inlet 70 through the substrate 14, the air channels 74, the capillaries 90, the openings 92 and, in some designs, the access holes 42. The pressurized air source 72 may also include air cooled using a cooling system or may include ambient-temperature environmental air. Air from the pressurized air source 72 may be introduced into the air inlets 70 through the substrate 14, through the center of the seal 76, into and through the air channels 74 in the inner core 20, into the capillaries 90, out through the openings 92 in the outer shell 18, and into the flow of exhaust across the top surface 26 of the plurality of insulating tiles 12. Thus the pressurized air that flows through the air channels 74 in the insulating tile 12, through the capillaries 90, and out of the capillaries 90 through the openings 92 serves to actively cool the insulating tiles 12 during use. Additionally, because the air from the air source will be cooler than the exhaust flow, the air that actively cools the tiles and exits the capillaries can have a cooling effect on the flow of exhaust downstream from the actively cooled tile. Thus the air that exits the capillaries 90 through the openings 92 can be used to actively cool the exhaust within the exhaust flow as well.

The air inlets 70 may be positioned to reduce the effects of any thermal flexing of the insulating tile 12 during use. For example, when heated, the insulating tile 12 may flex away from the substrate 14 at the center of the insulating tile 12. The air inlets 70 may be positioned at locations of lowest insulating tile 12 flexing so that any increased or reduced pressure exerted on the seal 76 from flexing of the insulating tile 12 during use is controlled. In some insulating tile systems, the region of least flexing may be toward the perimeter of the insulating tile 12, and thus the air inlets 70 may be positioned toward the perimeter of the insulating tile 12, for example at the corners of the insulating tile as depicted in FIG. 1. That is, the air inlets 70 may be placed at locations where there is the least distance change between the bottom surface 28 of the insulating tile 12 and the substrate 14 that results from flexing of the insulating tile 12 and/or substrate 14 during use of the MATPS 10.

Figure 6:
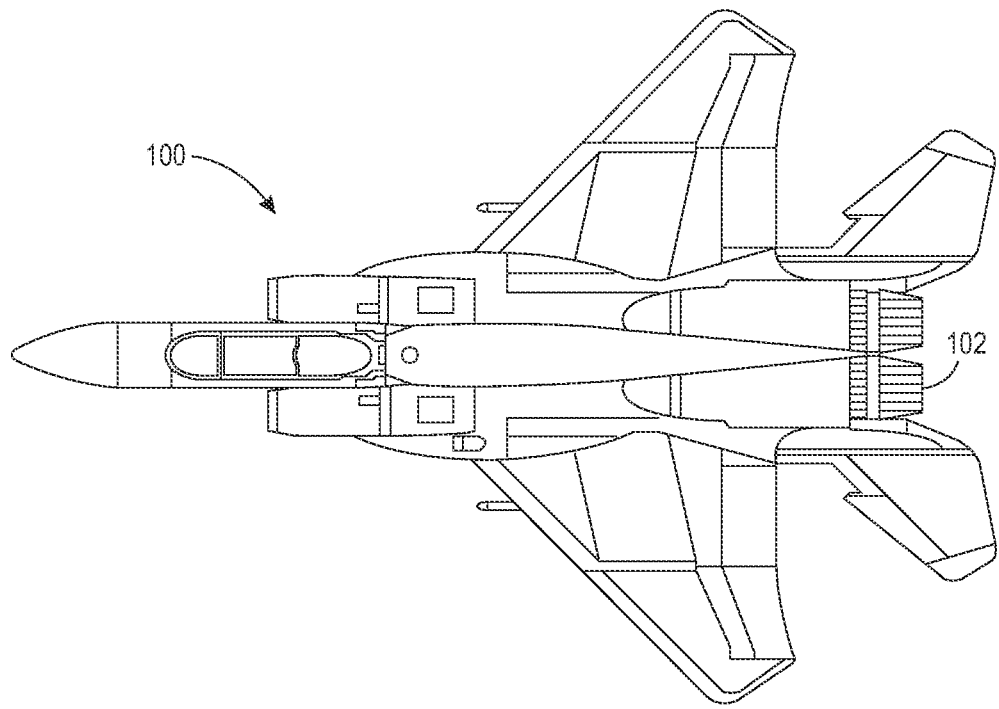
FIG. 6 depicts a flight vehicle within which the thermal protection system of the present disclosure may be employed.

FIG. 6 depicts an example of an aircraft 100 in which a MATPS of the present disclosure can be employed. For example, a MATPS can be employed in an aircraft exhaust system 102 of aircraft 100. It will be understood that a MATPS in accordance with the present teachings may be used in other aircraft systems, as well as various other non-aircraft systems where thermal protection is desired.

Thus it will be understood that the present teachings may include a mechanically attached thermal protection system including a plurality of thermal insulating tiles. The thermal insulating tiles may be attached to an underlying substrate using a system of brackets and nuts or other fasteners. The attachment between the substrate and the insulating tiles is directly beneath the insulating tile (i.e., directly interposed between the insulating tile and the substrate in a direction perpendicular to a major plane of the substrate and a major plane of the insulating tile) and within a perimeter of the insulating tile that is defined by the sides of the insulating tile. Each fastener may be accessed via an opening through the insulating tile itself. The bracket may be an L-shaped bracket having a first end attached to a side of the insulating tile and a second end proximate a bottom surface of the insulating tile and attached to a stud directly between the insulating tile and the substrate. Locating the fastener directly under the insulating tile allows, for example, closer placement of adjacent insulating tiles than is possible with some prior mechanically attached thermal protection systems.

Additionally, a MATPS in accordance with the present teachings can include active cooling. An active cooling system formed by actively cooled tiles in accordance with the present teachings may include air inlets through the substrate from which air is supplied to air channels within the interior inner core of the insulating tile. The active cooling system, if used, includes capillaries in fluid communication with the air channels within the inner core of the insulating tile that exhaust air from the air channel, through the outer shell on the top surface of the insulating tile, and into the exhaust stream or other environment. The present teachings may include any one or more, or all, of the mechanical attachment system, the air inlets through the substrate, air channels within the insulating tile, capillaries within the insulating tile, and openings within the top surface of the insulating tile that exhaust air from the insulating tile into the exhaust stream.

The technology described herein may be used in any system where thermal protection is desired. Examples include, but are not limited to, aerospace vehicles, military, commercial, or private flight vehicles, reusable spacecraft, thermal protection systems for military, commercial, or private purposes, ground-based vehicle systems, weapons systems, missiles, rockets, propulsion and afterburner systems, and re-entry systems. As used herein, "aircraft" refers to any vehicle capable of flight within an atmosphere, partial vacuum, and/or vacuum.

The present teachings may provide a MATPS system that protects an exhaust structure or any other structure from temperature extremes while maintaining structural integrity of the insulating tile. The MATPS system may protect an underlying structure in, for example, a thermoacoustic environment or an afterburner environment of a jet engine. While adhesive attachment of insulating tiles is limited to a maximum of about 700° F., the present teachings may be used in environments having surface temperatures of, for example, over 1500° F., over 2000° F., or over 2400° F. Additionally, MATPS as disclosed herein may reduce the labor required to remove and replace insulating tile structures in comparison with adhesively bonded thermal protection systems. Mechanical attachments have the ability to reduce both maintenance costs and vehicle maintenance turn times. In terms of repair, the attachments are designed and placed on the insulating tile so that the insulating tile can be removed with little or no damage to the insulating tile. The mechanical attachment is also designed to accommodate vibration from acoustic loading and maintain the structural integrity of the insulating tile.

To the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the present teachings.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A mechanically attached thermal protection system, comprising:
    an insulating tile comprising a top surface, a bottom surface, and a plurality of access holes that extend through the insulating tile from and through the top surface to and through the bottom surface;
    a plurality of brackets comprising a first end attached to the insulating tile and a second end comprising a mounting hole therethrough, the second end being positioned proximate the bottom surface of the insulating tile; and
    a plurality of fasteners positioned proximate the bottom surface of the insulating tile wherein each fastener is at least partially positioned within one of the access holes and is thereby accessible from the top surface of the insulating tile through one of the plurality of access holes.

2. The mechanically attached thermal protection system of claim 1 for use with a substrate comprising a surface, the thermal protection system further comprising:
    a plurality of studs extending from the surface of the substrate, wherein:
        each stud of the plurality of studs extends through one of the mounting holes in one of the plurality of brackets; and
        each fastener of the plurality of fasteners secures one of the plurality of brackets to one of the plurality of studs.

3. The mechanically attached thermal protection system of claim 1, wherein:
    the insulating tile comprises a perimeter; and
    each of the plurality of access holes, each of the mounting holes through the second end of each bracket, and each of the fasteners is within the perimeter of the insulating tile.

4. The mechanically attached thermal protection system of claim 1, wherein:
    the insulating tile further comprises a plurality of sides;
    each bracket is an L-shaped bracket; and
    each bracket is attached to one of the plurality of sides at an attachment point.

5. The mechanically attached thermal protection system of claim 4, wherein each bracket is attached to one of the plurality of sides at at least two attachment points.

6. The mechanically attached thermal protection system of claim 4, further comprising one or more machined, etched, or molded voids within each of the plurality of sides of the insulating tile, wherein a portion of each attachment point is positioned within one of the voids within the sides of the insulating tile.

7. The mechanically attached thermal protection system of claim 6, further comprising a plurality of ceramic matrix composite washers, wherein each ceramic matrix composite washer is positioned within one of the voids within the sides of the insulating tile.

8. The mechanically attached thermal protection system of claim 1 for use with a substrate comprising a surface having a plurality of air inlets therethrough, wherein the insulating tile further comprises:
    a plurality of sides;
    an inner core;
    an outer shell, wherein the outer shell forms at least a portion of the top surface, the bottom surface, and the plurality of sides; and
    a plurality of air channels, wherein each air channel of the plurality of air channels originates at an orifice through the outer shell of the bottom surface of the insulating tile and extends through the inner core of the insulating tile, wherein each air inlet of the plurality of air inlets is in fluid communication with one of the plurality of air channels.

9. The mechanically attached thermal protection system of claim 8, further comprising a plurality of studs extending from the surface of the substrate, wherein:
   each stud of the plurality of studs extends through one of the mounting holes in one of the plurality of brackets; and
   each fastener of the plurality of fasteners secures one of the plurality of brackets to one of the plurality of studs.

10. The mechanically attached thermal protection system of claim 9, further comprising a seal between each of the plurality of air inlets and each of the air plurality of air channels, wherein each seal comprises:
   a circular or oval inner spring seal comprising an arcuate cross section; and
   an outer compliant ring that physically contacts the spring seal.

11. The mechanically attached thermal protection system of claim 10, further comprising:
   a recess within the bottom surface of the insulating tile; and
   a ceramic matrix composite washer positioned within the recess in the bottom surface of the insulating tile,
   wherein the ceramic matrix composite washer physically contacts the insulating tile and the outer compliant ring.

12. The mechanically attached thermal protection system of claim 8, further comprising:
   a plurality of capillaries within the inner core that branch from the plurality of air channels; and
   a plurality of openings at the top surface of the insulating tile that extend through the outer shell, wherein each capillary terminates at one of the plurality of openings at the top surface.

13. The mechanically attached thermal protection system of claim 8, wherein at least one of the air channels through the inner core of the insulating tile opens into at least one of the access holes.

14. The mechanically attached thermal protection system of claim 1, wherein the insulating tile further comprises an inner core and an outer shell wrapped around the inner core, wherein:
   the outer shell forms at least a portion of the top the top surface, the bottom surface, and the plurality of sides;
   the outer shell comprises a composite comprising ceramic fibers; and
   the inner core comprises at least one of a ceramic, a silica, an alumina, and a fiber insulation.

15. An aircraft having a surface to be protected from a heat source, the aircraft further comprising:
   a plurality of studs extending from the surface;
   a mechanically attached thermal protection system (MATPS) attached to the surface of the aircraft, wherein the MATPS comprises:
      an insulating tile comprising a top surface, a bottom surface, and a plurality of access holes that extend through the insulating tile from and through the top surface to and through the bottom surface;
      a plurality of brackets comprising a first end attached to the insulating tile and a second end comprising a mounting hole therethrough, the second end being positioned proximate the bottom surface of the insulating tile; and
      a plurality of fasteners positioned proximate the bottom surface of the insulating tile wherein each fastener is at least partially positioned within one of the access holes and is thereby accessible from the top surface of the insulating tile through one of the plurality of access holes;
   wherein each stud of the plurality of studs extends through one of the mounting holes in one of the plurality of brackets, and each fastener of the plurality of fasteners secures one bracket of the plurality of brackets to one of the plurality of studs.

16. The aircraft of claim 15, wherein the surface to be protected is an exhaust output surface.

17. The aircraft of claim 15, wherein:
   the insulating tile comprises a perimeter; and
   each of the plurality of access holes, each of the mounting holes through the second end of each bracket, and each of the fasteners is within the perimeter of the insulating tile.

18. The aircraft of claim 15, wherein:
   the insulating tile further comprises a plurality of sides;
   each bracket is an L-shaped bracket; and
   each bracket is attached to one of the plurality of sides at an attachment point.

* * * * *